US006775700B2

(12) United States Patent
Cheng et al.

(10) Patent No.: US 6,775,700 B2
(45) Date of Patent: Aug. 10, 2004

(54) SYSTEM AND METHOD FOR COMMON INFORMATION MODEL OBJECT MANAGER PROXY INTERFACE AND MANAGEMENT

(75) Inventors: Heung-For Cheng, Portland, OR (US); Mahendra Ramachandran, Portland, OR (US); Srinivas Vuppula, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 09/817,023

(22) Filed: Mar. 27, 2001

(65) Prior Publication Data

US 2002/0144009 A1 Oct. 3, 2002

(51) Int. Cl.[7] .................... G06F 15/173
(52) U.S. Cl. .................... 709/225; 707/103; 719/313
(58) Field of Search .................... 709/223, 224, 709/225; 707/103; 719/313

(56) References Cited

U.S. PATENT DOCUMENTS 6,081,900 A * 6/2000 Subramaniam et al. ..... 713/201
6,317,748 B1 * 11/2001 Menzies et al. ........ 707/103 X
6,427,168 B1 * 7/2002 McCollum .................. 709/224
6,493,719 B1 * 12/2002 Booth et al. ............ 707/103 X
2002/0004815 A1 * 1/2002 Muhlestein et al. ........ 709/201
2002/0046352 A1 * 4/2002 Ludwig ...................... 713/201
2002/0052954 A1 * 5/2002 Polizzi et al. ............... 709/225
2002/0066033 A1 * 5/2002 Dobbins et al. ............ 713/201
2002/0083340 A1 * 6/2002 Eggebraaten et al. ....... 713/201
2002/0091809 A1 * 7/2002 Menzies et al. ............ 709/223
2002/0107872 A1 * 8/2002 Hudis et al. ............. 707/104.1
2002/0108102 A1 * 8/2002 Muhlestein et al. ........ 717/124
2002/0123966 A1 * 9/2002 Chu et al. ..................... 705/43

* cited by examiner

*Primary Examiner*—Bunjob Jaroenchonwanit
(74) *Attorney, Agent, or Firm*—Steven D. Yates

(57) ABSTRACT

A system, method and computer program for transmitting and receiving information between computer systems. This is accomplished using a common information model object manager (CIMOM) proxy that serves to receive and transmit information from one computer on the network to another. The CIMOM proxy relies on both managed system providers and client applications to register with the CIMOM proxy. Once registered the client application may request information and receive it from managed system providers.

10 Claims, 7 Drawing Sheets

MANAGED SYSTEM A
10
PROVIDER A
40
MANAGED SYSTEM B
20
PROVIDER B
60
MANAGED SYSTEM C
30
PROVIDER C
80
PROXY CIMOM
200
210
CIM CLIENT APPLICATION
140
CIM CLIENT
100
CIM CLIENT APPLICATION
150
CIM CLIENT
110
CIM CLIENT APPLICATION
160
CIM CLIENT
120

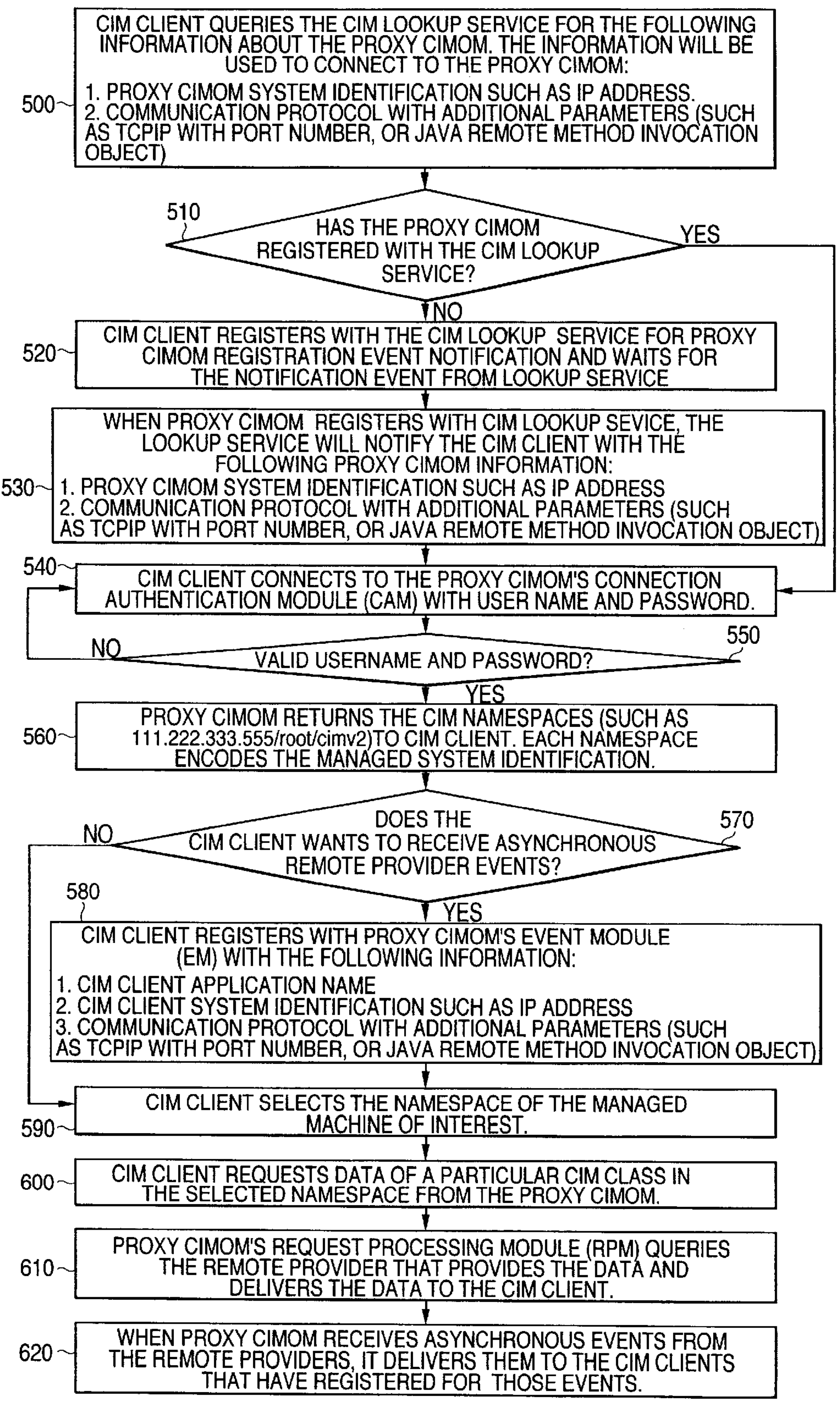
FIG. 5
CIM CLIENT QUERIES THE CIM LOOKUP SERVICE FOR THE FOLLOWING INFORMATION ABOUT THE PROXY CIMOM. THE INFORMATION WILL BE USED TO CONNECT TO THE PROXY CIMOM:
1. PROXY CIMOM SYSTEM IDENTIFICATION SUCH AS IP ADDRESS.
2. COMMUNICATION PROTOCOL WITH ADDITIONAL PARAMETERS (SUCH AS TCPIP WITH PORT NUMBER, OR JAVA REMOTE METHOD INVOCATION OBJECT)
500
510
HAS THE PROXY CIMOM REGISTERED WITH THE CIM LOOKUP SERVICE?
YES
NO
520
CIM CLIENT REGISTERS WITH THE CIM LOOKUP SERVICE FOR PROXY CIMOM REGISTRATION EVENT NOTIFICATION AND WAITS FOR THE NOTIFICATION EVENT FROM LOOKUP SERVICE
530
WHEN PROXY CIMOM REGISTERS WITH CIM LOOKUP SEVICE, THE LOOKUP SERVICE WILL NOTIFY THE CIM CLIENT WITH THE FOLLOWING PROXY CIMOM INFORMATION:
1. PROXY CIMOM SYSTEM IDENTIFICATION SUCH AS IP ADDRESS
2. COMMUNICATION PROTOCOL WITH ADDITIONAL PARAMETERS (SUCH AS TCPIP WITH PORT NUMBER, OR JAVA REMOTE METHOD INVOCATION OBJECT)
540
CIM CLIENT CONNECTS TO THE PROXY CIMOM'S CONNECTION AUTHENTICATION MODULE (CAM) WITH USER NAME AND PASSWORD.
550
NO
VALID USERNAME AND PASSWORD?
YES
560
PROXY CIMOM RETURNS THE CIM NAMESPACES (SUCH AS 111.222.333.555/root/cimv2)TO CIM CLIENT. EACH NAMESPACE ENCODES THE MANAGED SYSTEM IDENTIFICATION.
570
NO
DOES THE CIM CLIENT WANTS TO RECEIVE ASYNCHRONOUS REMOTE PROVIDER EVENTS?
YES
580
CIM CLIENT REGISTERS WITH PROXY CIMOM'S EVENT MODULE (EM) WITH THE FOLLOWING INFORMATION:
1. CIM CLIENT APPLICATION NAME
2. CIM CLIENT SYSTEM IDENTIFICATION SUCH AS IP ADDRESS
3. COMMUNICATION PROTOCOL WITH ADDITIONAL PARAMETERS (SUCH AS TCPIP WITH PORT NUMBER, OR JAVA REMOTE METHOD INVOCATION OBJECT)
590
CIM CLIENT SELECTS THE NAMESPACE OF THE MANAGED MACHINE OF INTEREST.
600
CIM CLIENT REQUESTS DATA OF A PARTICULAR CIM CLASS IN THE SELECTED NAMESPACE FROM THE PROXY CIMOM.
610
PROXY CIMOM'S REQUEST PROCESSING MODULE (RPM) QUERIES THE REMOTE PROVIDER THAT PROVIDES THE DATA AND DELIVERS THE DATA TO THE CIM CLIENT.
620
WHEN PROXY CIMOM RECEIVES ASYNCHRONOUS EVENTS FROM THE REMOTE PROVIDERS, IT DELIVERS THEM TO THE CIM CLIENTS THAT HAVE REGISTERED FOR THOSE EVENTS.

MANAGED PDA WITH REMOTE PROVIDER
PDA
810
LAPTOP COMPUTER
REMOTE MANAGEMENT CLIENT
820
CIM APPLICATION CLIENT
760
WORKSTATION
WAN/ WIRELESS ACCESS TO CIMOM
830
MANAGED SERVER A WITH REMOTE PROVIDER A
LAN BASED ACCESS TO CIMOM
10
SERVER
700
CIM LOOKUP SERVER
200
SERVER
20
SERVER
MANAGED SERVER B WITH REMOTE PROVIDER B
SERVER RUNNING PROXY-CIMOM

SYSTEM AND METHOD FOR COMMON INFORMATION MODEL OBJECT MANAGER PROXY INTERFACE AND MANAGEMENT

FIELD

The invention relates to a system and method for common information model object manager (CIMOM) proxy interface and management. More particularly, the present invention utilizes a CIMOM proxy to enable and simplify communications between remote providers and common information model (CIM) client applications.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. In addition, separate computer systems were linked together through different communications mechanisms such as, shared memory, serial and parallel ports, local area networks (LAN) and wide area networks (WAN). Further, with the development of the Internet and advancements in cellular and wireless communications, it is now possible for computers to communicate without the use of wires, such as provided by the public switched telephone network (PSTN), over great distances.

In order to facilitate communications between providers of different hardware and software, schemas and standards have been established. One such schema is the common information model (CIM) which is a common data model of an implementation-neutral schema for describing the overall management of information in a network/enterprise environment. FIG. 1 is an example implementation of a network in which communications is established utilizing CIM. In this example, provider A 40 in managed system A 10 through CIM object manager (CIMOM) 50 communicates to CIM client application 140 in CIM client 100, CIM client application 150 in CIM client 110, and CIM client application 160 in CIM client 120. Further in this example, provider B 60 in managed system B 20 through CIMOM 70 communicates to CIM client application 140 in CIM client 100, CIM client application 150 in CIM client 110, and CIM client application 160 in CIM client 120. Still further in this example, provider C 80 in managed system C 30 through CIMOM 90 communicates to CIM client application 140 in CIM client 100, CIM client application 150 in CIM client 110, and CIM client application 160 in CIM client 120. It should be noted that managed system A 10, managed system B 20, managed system C 30, CIM client 100, CIM client 110, and CIM client 120 are all depicted as independent computer systems or processors communicating with each other over a LAN, WAN, PSTN or any other suitable communications mechanism. It should also be noted that CIMOM 50, 70, 90 comprise all software, logic and hardware required for communications.

However, the requirement that separate copies of CIMOM 50, 70, 90 in each management system requires the use of an enormous amount of memory throughout all the systems. Further, there is no limit on the number of management systems and CIM client applications that may exist within a network. Further, each management system would be required to not only utilize its own memory to store each CIMOM but also its own processor to execute the logic involved in CIMOM.

Therefore, what is required is a system and method whereby the need for each management system to have its own copy of CIMOM is eliminated. This system and method should also minimize the processor time required to establish communications with CIM client applications.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 5 is a flowchart of the interaction between the CIM client application and the proxy CIMOM in an example embodiment of the present invention;

DETAILED DESCRIPTION

Figure 1:
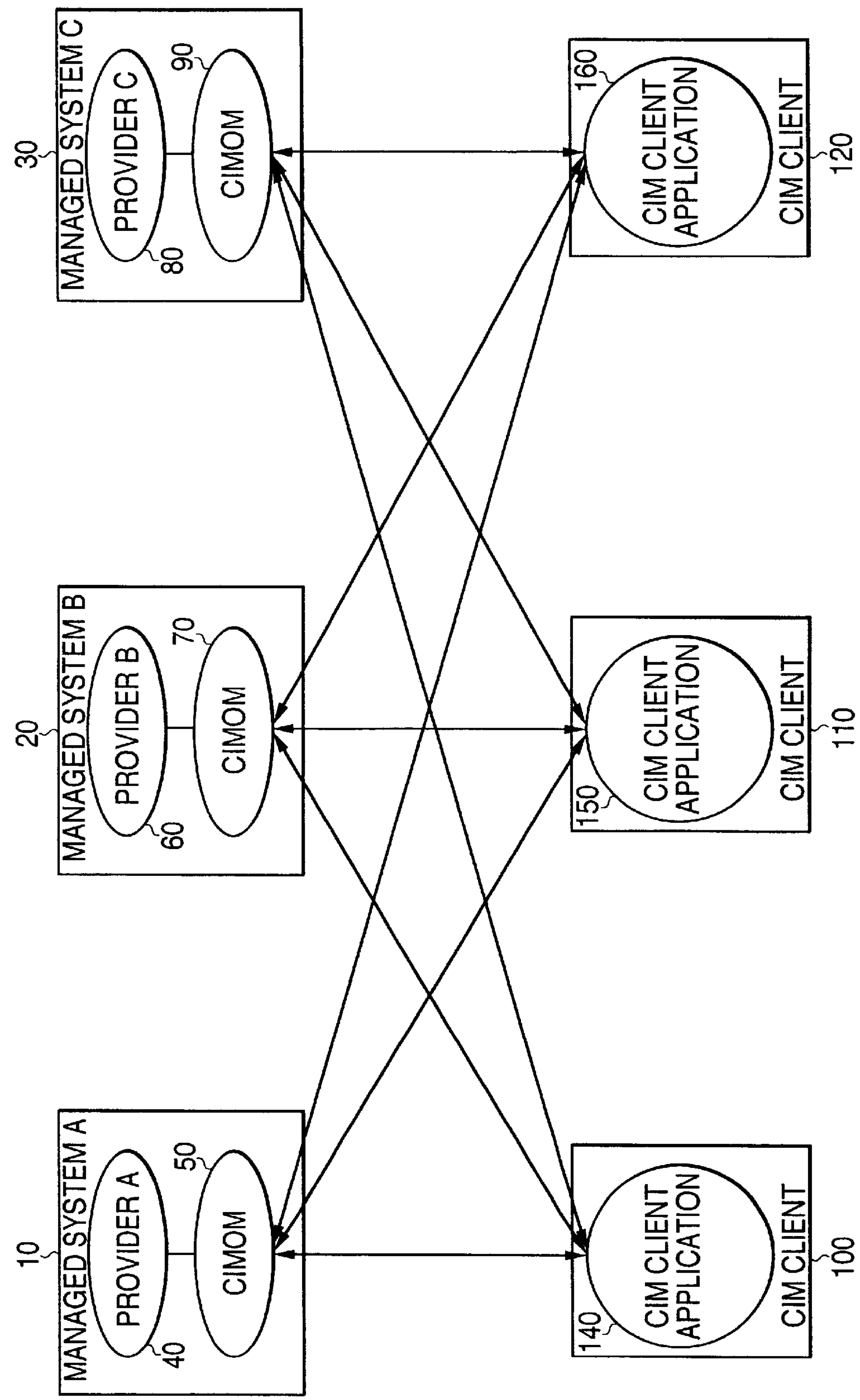
FIG. 1 is an example of the prior art in common information model (CIM) communications.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGs. for simplicity of illustration and discussion, and so as not to obscure the invention.

Figure 2:
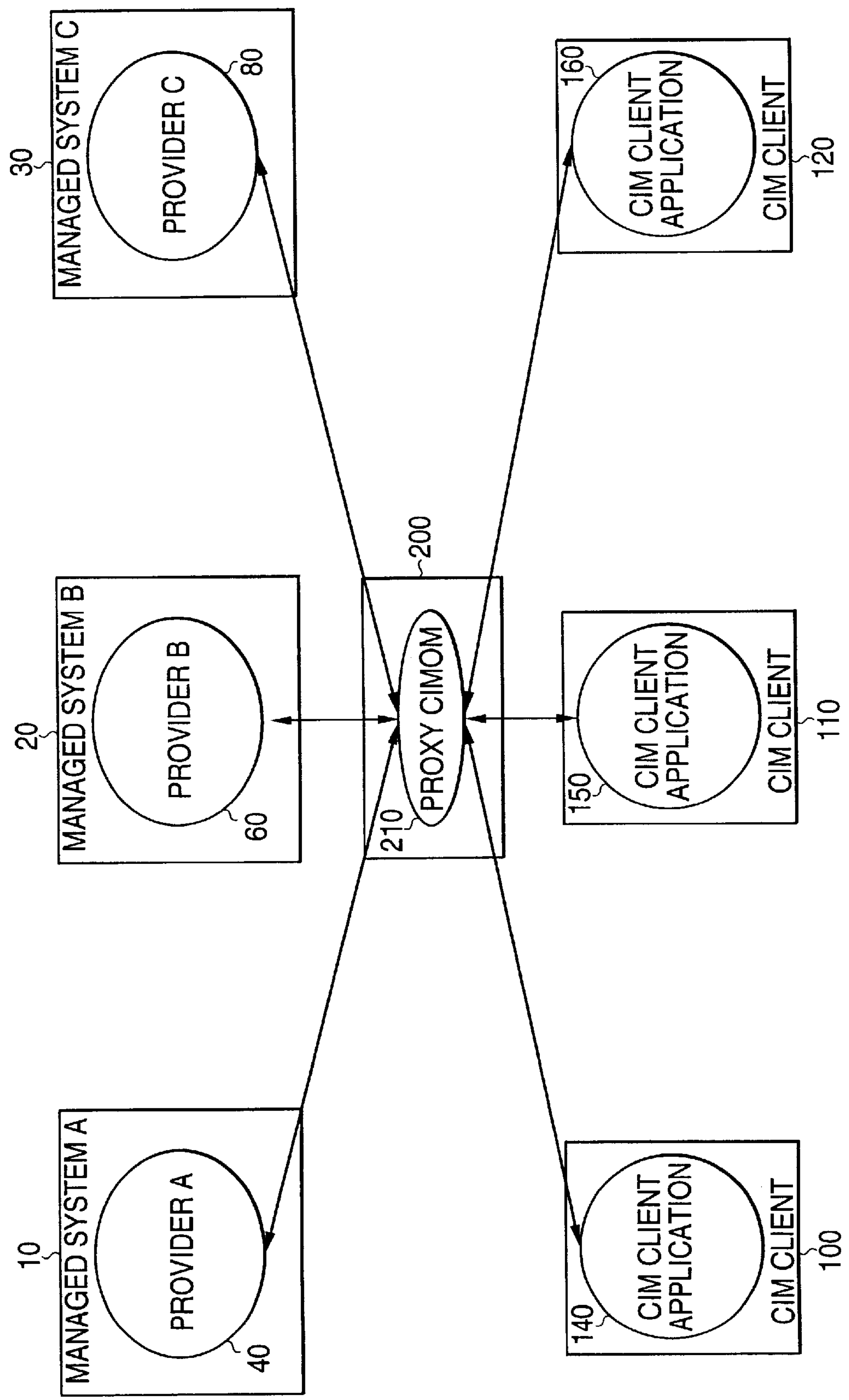
FIG. 2 is a systems diagram of a communications network using a proxy CIMOM to facilitate communications between managed systems and CIM client applications in an example embodiment of the present invention.

FIG. 2 is a systems diagram of a communications network using a proxy CIMOM 210 in a server 200 to facilitate communications between managed systems A 10, managed systems B 20, and managed systems C 30 and CIM client applications 100, 110, and 120 in an example embodiment of the present invention. As would be appreciated by one of ordinary skill in the art, the proxy CIMOM 210 does not need to be contained in a separate processor or computer system. The proxy CIMOM 210 may reside in any server, processor, or computer system in which it is a common resource for use by the other managed systems in the network.

Still referring to FIG. 2, communications between, for example, provider A 40 and CIM client application 140 would occur through server 200 using proxy CIMOM 210. The precise communications mechanism used between any of the systems shown in FIG. 2 would include any form of communications utilized to communicate from one computer to another. This would include both serial and parallel communications over, but not limited to, twisted pair, coax cable, fiber optic cable and all forms of wireless communications. Provider A 40 would also communicate to CIM client application 150 and CIM client 160 through proxy CIMOM. In a similar manner provider B 60, provider C 80 would communicate to CIM client application 140, 150 and 160 through proxy CIMOM 210. The precise manner by which the proxy CIMOM 210 operates will be discussed in further detail in reference to FIGS. 3 through 6 ahead.

Figure 3:
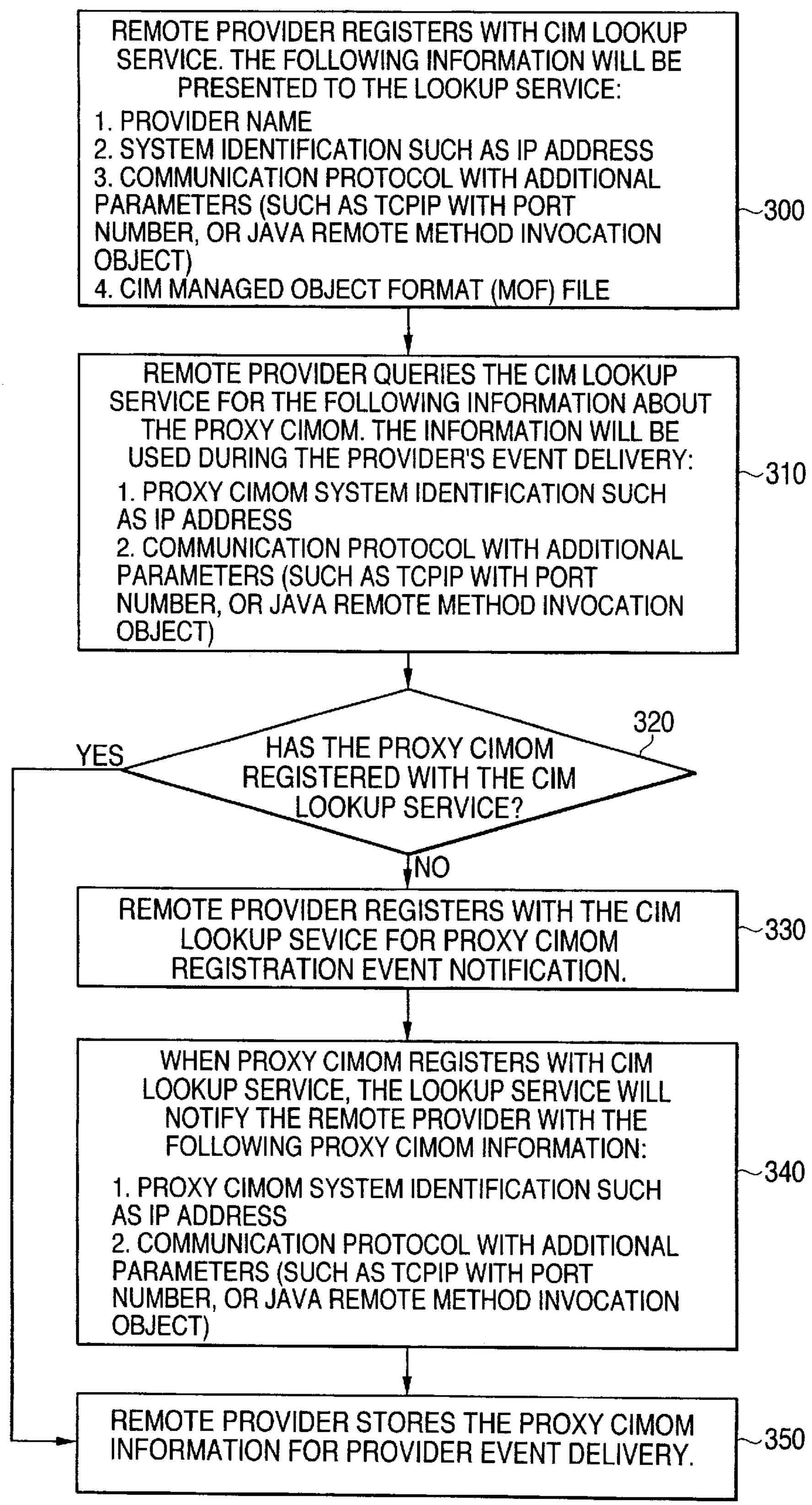
FIG. 3 is a flowchart of a remote provider registering with a CIM lookup service and determining the location of the proxy CIMOM in an example embodiment of the present invention.
Figure 6:
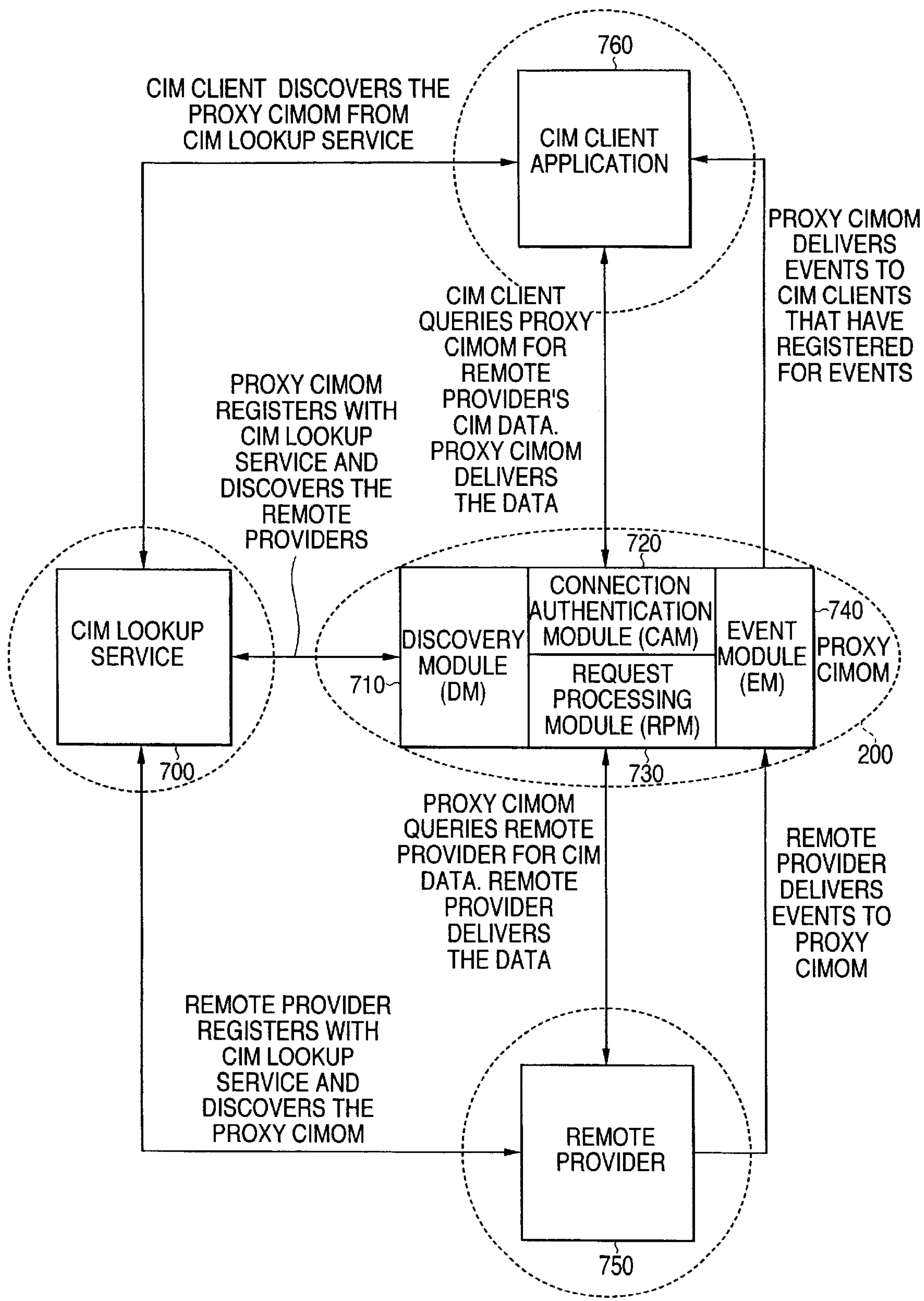
FIG. 6 is a data flow diagram between the proxy CIMOM, the remote provider, the CIM lookup service and the CIM client.

FIG. 3 is a flowchart of a remote provider 750, shown in FIG. 6, registering with a CIM lookup service 700, shown in FIG. 6, and determining the location of the proxy CIMOM 200 in an example embodiment of the present invention. The remote provider 750, shown in FIG. 6, may be provider A 40, provider B 60 or provider C 80 shown in FIG. 2 or some other provider not shown.

Still referring to FIG. 3, execution begins by the remote provider 750, such as provider A 40, shown in FIG. 2, registering with a CIM lookup service 700 in operation 300. In operation 300, this registration process would entail the remote provider 750 transmitting certain information to CIM lookup service 700. This information would include the remote provider 750 name, the system identification number, such as an Internet Protocol (IP) address, the communications protocol, and the CIM management object format (MOF) file. The communications protocol would include additional parameters such as a TCP/IP (Transmission Control Protocol/Internet Protocol) Port number or a JAVA remote method invocation object. The MOF file would be used by the Proxy CIMOM 200 to facilitate communications.

Still referring to FIG. 3, processing then proceeds from operation 300 to operation 310. In operation 310, the remote provider 750 then queries the CIM lookup service 700 for information regarding the proxy CIMOM 200. This information would include the proxy CIMOM system identification such as the IP address for the proxy CIMOM 200. This information would further include the communications protocol that should be used when communicating to the proxy CIMOM 200, such as TCP/IP or Java remote method invocation. Thereafter, processing proceeds to operation 320, where it is determined if the proxy CIMOM 200 has registered itself with the CIM lookup service 700. If the proxy CIMOM 200 has not registered itself with the CIM lookup service 700 then processing proceeds to operation 330. In operation 330, the remote provider 750 registers at the request of the CIM lookup service 700, as a result of receiving a negative response from the CIM lookup service in operation 320, for a proxy CIMOM registration event notification. In operation 340, the registration of the proxy CIMOM 200 has occurred by the proxy CIMOM 200 registering with the CIM lookup service 700 causing the generation of a proxy CIMOM registration event which notifies the remote provider 750 of the registration event. This registration event causes the transmission of proxy CIMOM system identification, such as IP address, and the communication protocol to the remote provider 750. Thereafter, processing proceeds to operation 350 from either operation 340 or from operation 320. In operation 350, the remote provider 750 stores the proxy CIMOM information for future remote provider event delivery in either the case that the proxy CIMOM 200 should change its registration information or should the proxy CIMOM 200 register for the first time with the CIM lookup service 700. The registration process shown in FIG. 3 then terminates.

Figure 4:
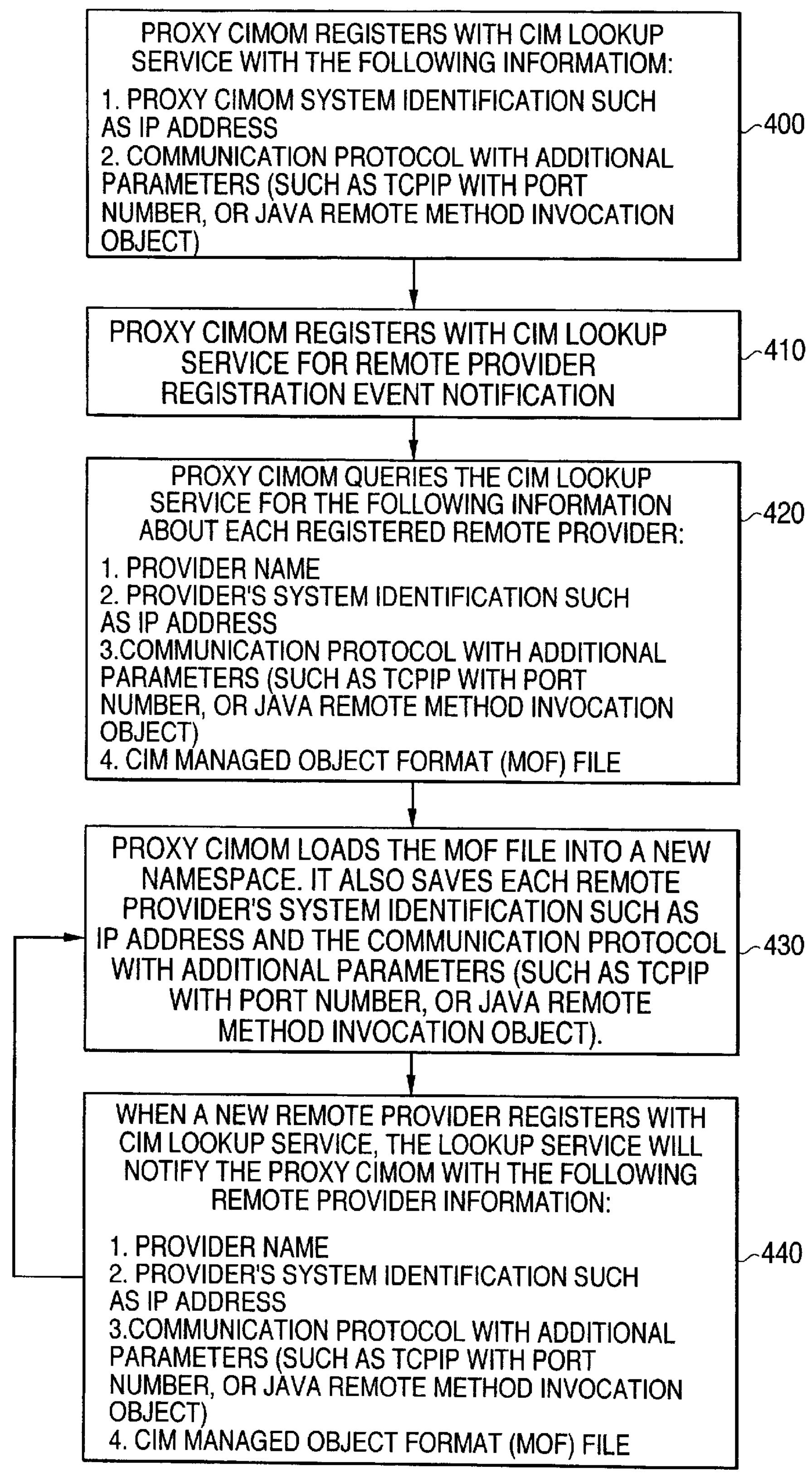
FIG. 4 is a flowchart of the logic executed by the CIMOM discovery module shown in FIG. 6 in an example embodiment of the present invention.

FIG. 4 is a flowchart of the logic executed by the CIMOM discovery module 710, shown in FIG. 6, in an example embodiment of the present invention. The CIMOM discovery module 710 begins execution in operation 400 where the proxy CIMOM 200 registers with the CIM lookup service 700 and transmits the appropriate information required. This information would include the proxy CIMOM 200 system identification such as, but not limited to, its system identification number, the IP address and additional parameters. Processing then proceeds to operation 410 where the proxy CIMOM 200 registers with the CIM lookup service 700 for remote provider registration event notification discussed in further detail in reference to FIG. 5. Thereafter in the discovery module 710, in operation 420, the proxy CIMOM 200 queries for information relating to each remote provider 750. This information would include the remote provider's 750 name, the remote providers's 750 system identification, the communication protocol to be used, and the MOF file. The remote provider's system identification may be, but not limited to, an IP address. The communication protocol may be, but not limited to TCP/IP including a port number or a JAVA remote method invocation object.

Still referring to FIG. 4, processing in the discovery module 710 then proceeds to operation 430 where the MOF file is loaded into a new name space in the proxy CIMOM 200 along with the information transmitted in operation 420. This information would include the remote provider's 750 name, the remote providers's 750 system identification, the communication protocol to be used. Thereafter, in operation 440, whenever a new remote provider 750 registers with the CIM lookup service 700, the CIM lookup service 700 will notify the proxy CIMOM 200 of the new remote provider. This notification would include the remote provider's 750 name, the remote providers's 750 system identification, the communication protocol to be used, and the MOF file. Thereafter, the discovery module 710 would loop back to and repeat operation 430. This process continues until such time as the network or the proxy CIMOM 200 are taken offline.

FIG. 5 is a flowchart of the interaction between the CIM client application 760, shown in FIG. 6, and the proxy CIMOM 200, shown in FIGS. 2 and 6, in an example embodiment of the present invention. It should be noted that the CIM client application 760 may be any CIM client application 140, 150, and 160 shown in FIG. 2. Processing begins in operation 500 where the CIM client application 760 queries the CIM lookup service 700 for information related to the proxy CIMOM 200 and required to connect the CIM client application 760 to the proxy CIMOM 200. This information includes the proxy CIMOM 200 identification number, such as Internet Protocol (IP) address, and the communications protocol. The communications protocol would include additional parameters such as a TCP/IP port number or a JAVA remote method invocation object. Thereafter, processing proceeds to operation 510 where it is determined if the proxy CIMOM 200 has registered with the CIM lookup service 700.

Still referring to FIG. 5, if the proxy CIMOM 200 has not registered with the CIM lookup service 700, then processing proceeds to operation 520 where the CIM client application 760 registers with the CIM lookup service 700 for a proxy CIMOM 200 registration event notification and the CIM client application 760 then waits for the event notification to take place. Once the proxy CIMOM 200 registration event notification takes place by the proxy CIMOM 200 registering with the CIM lookup service, as previously discussed, then in operation 530 the CIM lookup service 700 transmits the proxy CIMOM 200 identification number, such as Internet Protocol (IP) address, and the communications protocol. The communications protocol would include additional parameters such as a TCP/IP port number or a JAVA remote method invocation object. Processing then proceeds to operation 540 from operation 530 or from operation 510, if the proxy CIMOM 200 has registered with the CIM lookup service 200. In operation 540, the CIM client application 760 connects to the proxy CIMOM 200 via the connection authentication module (CAM) 720 and supplies a user name and password to the CAM 720.

Still referring to FIG. 5, in operation 550, if the CIM client provides a correct user name and password then processing proceeds to operation 560, otherwise processing returns to operation 540 which is repeated until a correct user name and password is entered. As would be appreciated by one of ordinary skill in the art, after some number of failed attempts are made the CAM 720 would simply bar further attempts for the CIM client application 760 to receive authentication during this session. However, if it is determined that the user name and password are valid, in operation 550, then processing proceeds to operation 560. In operation 560, the proxy CIMOM 200 returns the proxy CIMOM 200 name spaces which may include the address or identification of the remote providers 760. As previously discussed the remote providers 760 may be any of the managed systems 10, 20, and 30 shown in FIG. 2.

Still referring to FIG. 5, thereafter in operation 570, it is determined if the CIM client application 760 desires to receive asynchronous remote provider 750 events. If the CIM client application 760 desires to receive asynchronous remote provider 750 events then processing proceeds to operation 580 where the CIM client application 760 registers with the event module 740 contained within the proxy CIMOM 200. The event module is given the CIM client application 760 name, the CIM client application 760 system identification, such as the IP address, and the communication protocol to use. The communication protocol may be, but not limited to TCP/IP, including a port number, or a JAVA remote method invocation object. Thereafter, processing proceeds to operation 590 from either operation 580 or operation 570 in the case that the CIM client application 760 does not desire to receive asynchronous remote provider 750 events.

Still referring to FIG. 5, in operation 590, the CIM client application 760 selects the name space of the remote provider 750 of interest. Thereafter, in operation 600, the CIM client application 760 requests data of the particular CIM class in the selected name space associated with the remote provider 750 from the proxy CIMOM 200. In operation 610, the request processing module (RPM) 730 in the proxy CIMOM 200 queries the remote provider 750 for delivery of the CIM class data requested by the CIM client application 760. Thereafter, processing proceeds to operation 620 where the proxy CIMOM 200 receives the asynchronous events and data from the remote provider 750 and thereafter delivers the data to the CIM client application 760 which has registered for these particular events. It should be noted that more than one CIM client application 760, such as managed systems A 10, managed system B 20, or managed system C 30, may request the same data from a remote provider 750.

FIG. 6 is a data flow diagram illustrating the flow of information between the proxy CIMOM 200, the remote provider 750, the CIM client application 760, and the CIM lookup service 700. FIG. 6 contains modules representing software, commands, firmware, hardware, instructions, computer programs, subroutines, code and code segments previously discussed in reference to the example flowcharts FIGS. 3 through 5. The modules shown in FIG. 6 may take any form of logic executable by a processor, including, but not limited to, programming languages, such as C++. Typically, a CIM client application 760 will attempt to discover the location of the proxy CIMOM 200 by accessing and registering with a CIM lookup service 700. The proxy CIMOM 200 also accesses the CIM lookup service 700 to discover the location of the remote providers 750. The CIM client application 760 is provided with the location (address) of the proxy CIMOM 200. The CIM client application 760 then queries the proxy CIMOM 200 for remote provider 750 CIM data. The proxy CIMOM 200 queries the remote provider 750 for the CIM data. The remote provider 750 then delivers the data to the proxy CIMOM 200 and in turn the proxy CIMOM 200 delivers the remote provider 750 data to the CIM client application 760. Prior to access and delivery of such remote provider 750 data, the remote provider 750 must register with a CIM lookup service 700 which in turn updates the proxy CIMOM 200 with the location of the remote provider 750.

Figure 7:
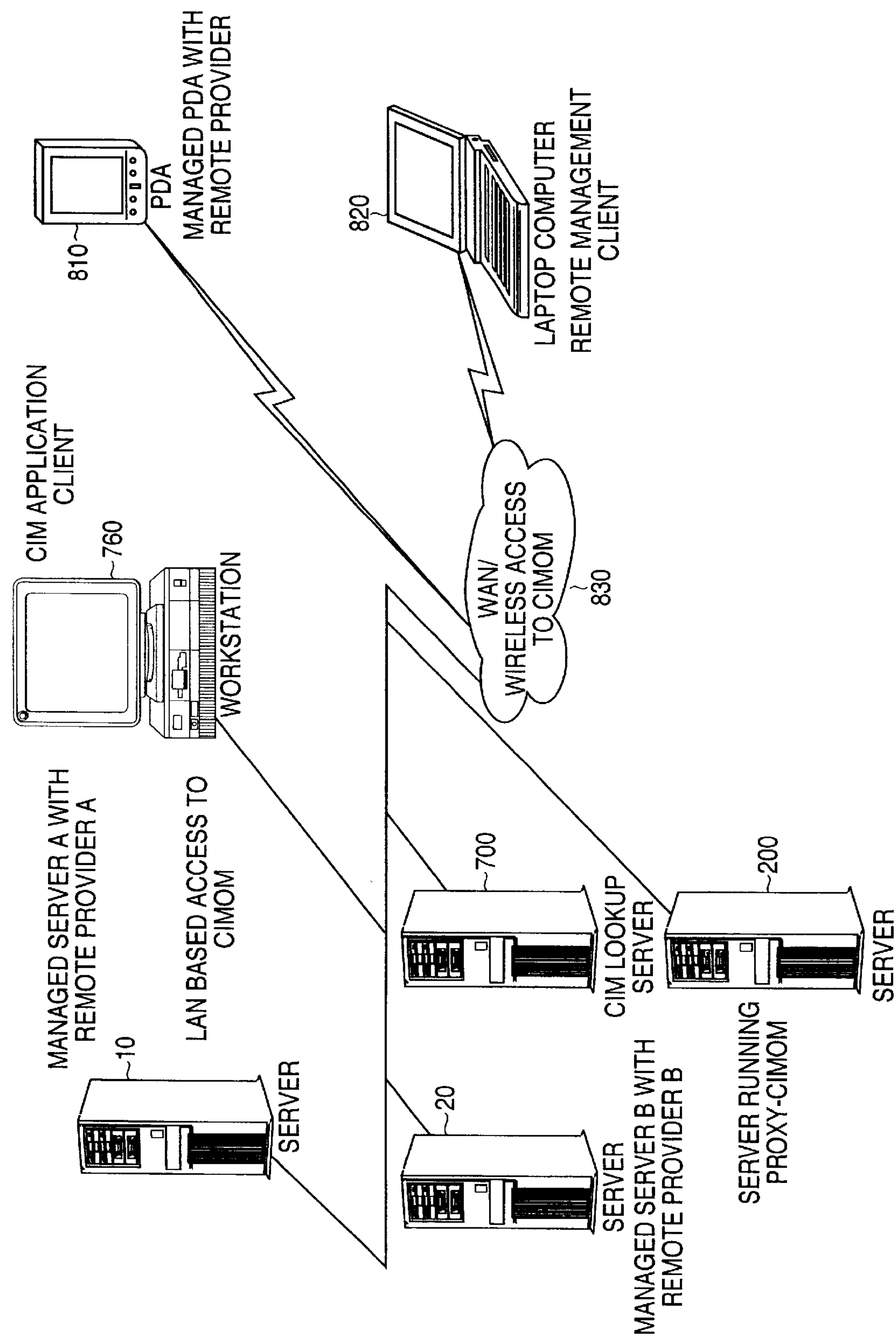
FIG. 7 is an alternate configuration of the systems diagram provided in FIG. 2 depicting possible hardware that may be used.

FIG. 7 is an alternate configuration of the systems diagram provided in FIG. 2 depicting possible hardware that may be used. FIG. 7 contains a proxy CIMOM 200 server connected through a LAN or WAN to a managed system A 10, a managed system B 20, a managed PDA system 810, and a server used for the CIM lookup service 700. In addition, FIG. 7 illustrates a connection to LAN, WAN or wireless access 830 to the proxy CIM 200. This WAN or wireless access 830 may be through any communication means that allows at least two computer systems to communicate with each other. This wireless access 830 or WAN may be a cellular telephone network or a satellite telephone network. The personal digital assistant (PDA) 810 is a managed system like managed system A 10. A remote provider runs on the PDA providing the managed data of the PDA to the proxy CIMOM. In addition, a laptop communicating through a cellular phone may act as a CIM client application 760. Therefore, the hardware utilized to implement the embodiments of the present invention is not intended to limit the present invention strictly to that herein described.

The benefit resulting from the present invention is that a simple, reliable, fast system and method is provided for computers and processors to communicate to each other. Further, the sending and receiving computers require the use of minimal space and processor time to send and receive information through the use of a proxy CIMOM.

While we have shown and described only a few examples herein, it is understood that numerous changes and modifications as known to those skilled in the art could be made to the example embodiment of the present invention. Therefore, we do not wish to be limited to the details shown and described herein, but intend to cover all such changes and modifications as are encompassed by the scope of the appended claims.

We claim:

1. A method of communicating between computers in a network, comprising:

registering with proxy CIMOM by a remote provider of a plurality of remote providers and a client application of a plurality of client applications sending information to a CIM lookup service;

discovering the location of the proxy CIMOM by the CIM lookup service and transmitting the received from the remote provider of the plurality of remote providers and the client application of the plurality of client applications;

transmitting the location of the proxy CIMOM to the remote provider of the plurality of remote providers and the client application of the plurality of client applications;

requesting information of the remote provider of the plurality of remote providers by the client application of the plurality of client applications transmitting the request to the proxy CIMOM;

relaying the request to the remote provider of the plurality of remote providers by the CIMOM proxy, wherein said relaying includes checking a database contained in the proxy CIMOM to determine the location of the remote provider, transmitting the request for information to the remote provider, and queuing the request for information in a file when a match cannot be found the database for the remote provider; and transmitting the information to the client application upon receipt by the proxy CIMOM.

2. The method recited in claim 1, wherein registering with proxy CIMOM by the remote provider of the plurality of remote providers, further comprises:

checking the file containing the queued requests for information to determine that a request for information is present for the remote provider in the file; and transmitting the request for information to the remote provider upon completing the registering of the remote provider.

3. The method recited in claim 1, wherein registering with proxy CIMOM by a client application of a plurality of client applications sending information to a CIM lookup service, further comprises:

transmitting a client application name, a client application identification and a communication protocol desired to the CIM lookup service; and relaying the client application name, the client application identification and the communication protocol desired to the proxy CIMOM by the CIM lookup service.

4. The method recited in claim 1, wherein registering with proxy CIMOM by a remote provider of a plurality of remote providers sending information to a CIM lookup service, further comprises:

transmitting a remote provider name, a remote provider identification, a MOF file and a communication protocol desired to the CIM lookup service; and relaying the remote provider name, the remote provider identification, the MOF file and the communication protocol desired to the proxy CIMOM by the CIM lookup service.

5. A computer program embodied on a computer accessible medium executable by a computer for communicating between computers in a network, comprising:

registering with proxy CIMOM by a remote provider of a plurality of remote providers and a client application of a plurality of client applications sending information to a CIM lookup service;

discovering the location of the proxy CIMOM by the CIM lookup service and transmitting the received from the remote provider of the plurality of remote providers and the client application of the plurality of client applications; transmitting the location of the proxy CIMOM to the remote provider of the plurality of remote providers and the client application of the plurality of client applications;

requesting information of the remote provider of the plurality of remote providers by the client application of the plurality of client applications transmitting the request to the proxy CIMOM;

relaying the request to the remote provider of the plurality of remote providers by the proxy CIMOM, transmitting the information to the client application upon receipt by the proxy CIMOM, checking a database contained in the proxy CIMOM to determine the location of the remote provider, and queuing the request for information in a file when a match cannot be found in the database for the remote provider; and transmitting the request for information to the remote provider.

6. The computer program recited in claim 5, wherein registering with proxy CIMOM by the remote provider of the plurality of remote providers, further comprises:

checking the file containing the queued requests for information to determine that a request for information is present for the remote provider in the file; and transmitting the request for information to the remote provider upon completing the registering of the remote provider.

7. The computer program recited in claim 5, wherein registering with proxy CIMOM by a client application of a plurality of client applications sending information to a CIM lookup service, further comprises:

transmitting a client application name, a client application identification and a communication protocol desired to the CIM lookup service; and relaying the client application name, the client application identification and the communication protocol desired to the proxy CIMOM.

8. The computer program recited in claim 5, wherein registering with proxy CIMOM by a remote provider of a plurality of remote providers sending information to a CIM lookup service, further comprises:

transmitting a remote provider name, a remote provider identification, a MOF file and a communication protocol desired to the CIM lookup service; and relaying the remote provider name, the remote provider identification, the MOF file and the communication protocol desired to the proxy CIMOM by the CIM lookup service.

9. An apparatus comprising a machine accessible media having associated data, which when accessed by one or more machines of a network of machines, results in performing:

registering with proxy CIMOM by a remote provider of a plurality of remote providers and a client application of a plurality of client applications sending information to a CIM lookup service;

discovering the location of the proxy CIMOM by the CIM lookup service and transmitting the received from the remote provider of the plurality of remote providers and the client application of the plurality of client applications; transmitting the location of the proxy CIMOM to the remote provider of the plurality of remote providers and the client application of the plurality of client applications;

requesting information of the remote provider of the plurality of remote providers by the client application of the plurality of client applications transmitting the request to the proxy CIMOM;

relaying the request to the remote provider of the plurality of remote providers by the proxy CIMOM, transmitting the information to the client application upon receipt by the proxy CIMOM, checking a database contained in the proxy CIMOM to determine the location of the remote provider, and The computer program recited in claim 15, wherein the checking a database contained in the proxy CIMOM to determine the location of the remote provider, further comprises: queuing the request for information in a file when a match cannot be found in the database for the remote provider; and transmitting the request for information to the remote provider.

10. The apparatus of claim 9, wherein said data for registering with proxy CIMOM by the remote provider of the plurality of remote providers further comprises data, which when accessed, results in:

checking the file containing the queued requests for information to determine that a request for information is present for the remote provider in the file; and transmitting the request for information to the remote provider upon completing the registering of the remote provider.

* * * * *